July 1, 1958     A. E. NOBLE ET AL     2,841,341
ROTARY TYPE MACHINE FOR GRANULATING POLYSTYRENE PELLETS
Filed Aug. 28, 1953     2 Sheets—Sheet 1
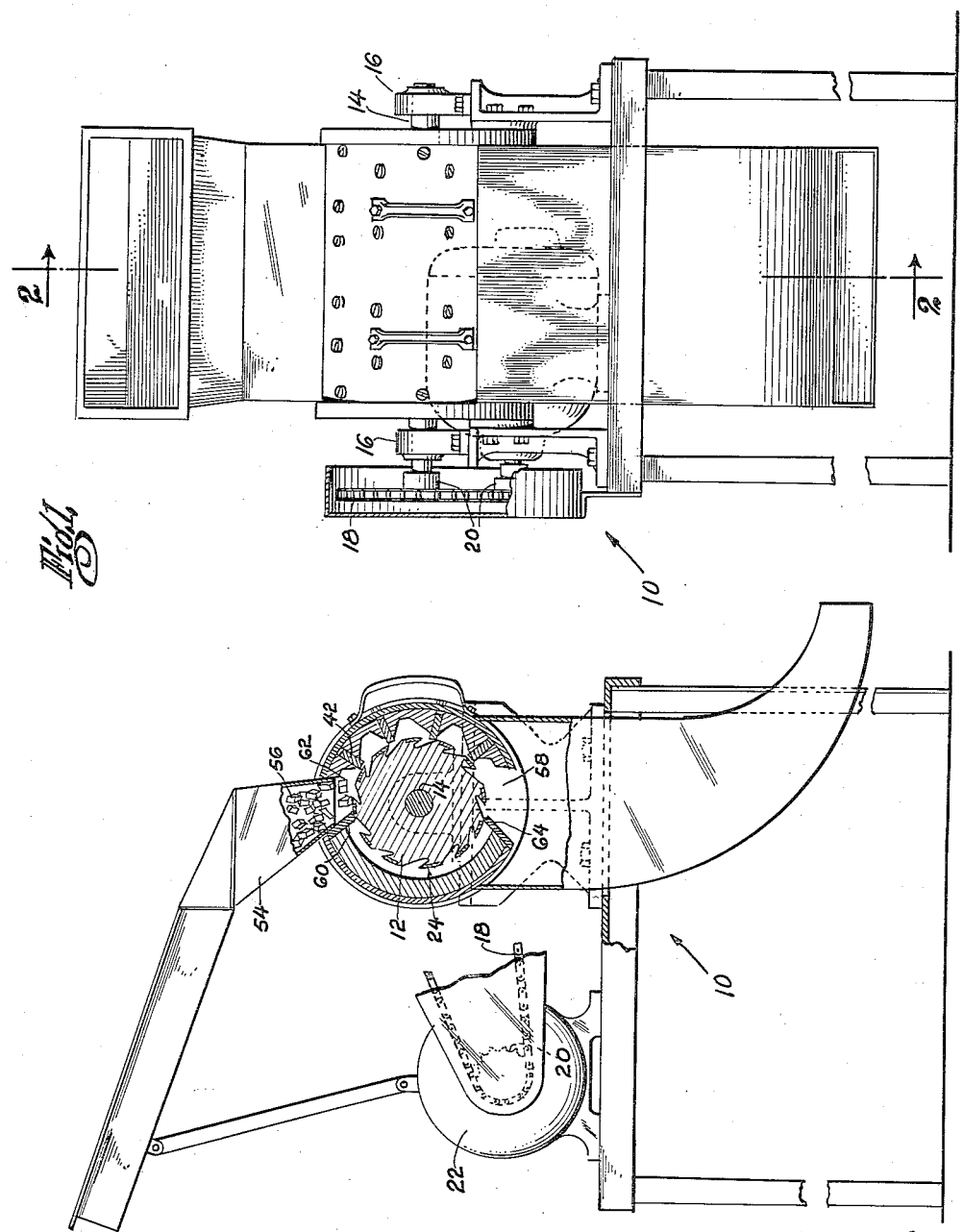
INVENTORS
Aubrey E. Noble & Charles F. Anness Jr.
BY
Eyre, Mann & Burrows
ATTORNEYS July 1, 1958      A. E. NOBLE ET AL      2,841,341
ROTARY TYPE MACHINE FOR GRANULATING POLYSTYRENE PELLETS
Filed Aug. 28, 1953      2 Sheets-Sheet 2
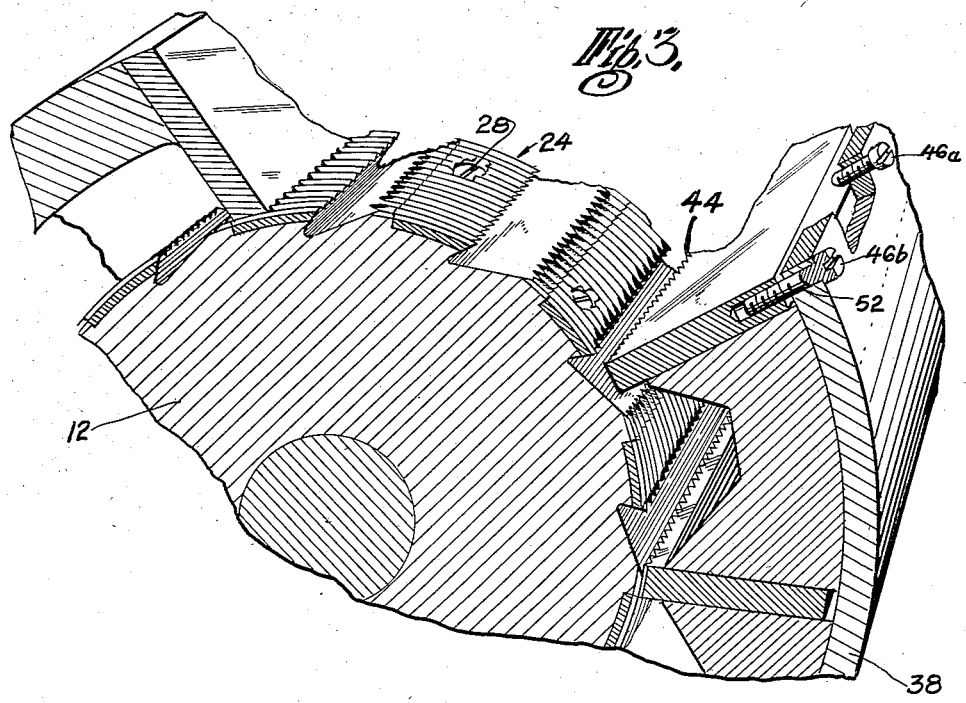
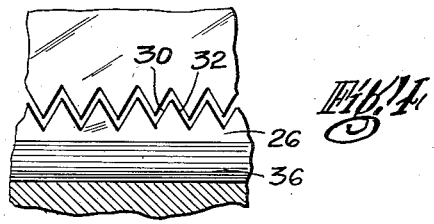
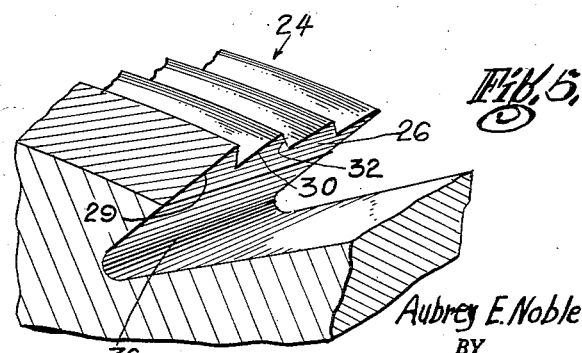
INVENTORS
Aubrey E. Noble + Charles F. Anness Jr.
BY
ATTORNEYS

United States Patent Office 2,841,341
Patented July 1, 1958

2,841,341

ROTARY TYPE MACHINE FOR GRANULATING POLYSTYRENE PELLETS

Aubrey E. Noble, Plainfield, and Charles F. Anness, Jr., Sewaren, N. J., assignors to Catalin Corporation of America, a corporation of Delaware Application August 28, 1953, Serial No. 377,018

3 Claims. (Cl. 241—243)

This invention relates to a rotary type machine which is particularly adapted for use in cutting polystyrene pellets into granules.

As is known, polystyrene is manufactured and sold in the form of small pellets. When these pellets are used for molding colored pieces they have to be granulated before being mixed with dry pigment in order to get a uniform color without streaks. Machines currently used for this purpose employ rapidly revolving hammers which smash the styrene pellets to break them up into granules which are thereafter screened to size. Much difficulty has been experienced with such equipment because heat is generated by the hammers and the heat must be dissipated or the styrene tends to melt and lose its desired granular form. Cooling devices for dissipating the heat have been suggested but even with such cooling devices the machines have not proven very satisfactory and in the case of high impact styrene which strongly resists fracture the machines are impractical for commercial use.

We have now discovered that if the styrene pellets are granulated by subjecting them to the cutting action of blade members instead of the crushing action of blunt-end hammers, no appreciable amount of heat is generated, the proportion of fines produced is low and it is possible to effectively granulate high-impact polystyrene as well as the ordinary type of styrene.

In carrying out our invention, we provide a rotary type granulating machine having teeth positioned in a stator adapted to cooperate with blade members positioned on a rotor for cutting the styrene pellets into granules. The blade members are in the general form of V-shaped grooves running around the circumference of the rotor which are interrupted at set intervals by a somewhat wedge-shaped channel extending across the face of the rotor. The channels also extend down into the surface of the rotor below the blade members to form a recess which receives and protects the cut styrene granules from further cutting action of the blade members. In order to achieve the desired cutting action between the stator teeth and blade members, the leading end portion of each blade member is undercut to provide a cutting edge on each side of the blade which slopes back down away from the top of the V. In operation, cutting starts at the top of the V and then progresses down along the cutting edges on each side so that at any given time the cutting action is restricted to a very limited area of the styrene pellet. By cutting the pellets in this way very little heat is generated and the amount of fines produced is low giving high yields. Although we have described the blade members as being in the general form of V-shaped grooves, it will be understood that the term V-shaped is used broadly herein and it is meant to include blade members having sides of any desired angularity.

These and other advantages of our invention can be readily understood by reference to the accompanying drawing in which Fig. 1 is a front view of our granulating machine;
Fig. 2 is a sectional view taken on line 2—2 of Fig. 1;
Fig. 3 is an isometric view showing the rotor blade members and stator teeth;
Fig. 4 illustrates the way in which the rotor blade members and stator teeth mesh and
Fig. 5 is an enlarged isometric view of the rotor blade members.

Turning now to the drawings, our granulating machine 10 comprises a cylindrical rotor 12 mounted on a shaft 14 carried in suitable standards 16. Rotor 12 is driven by means of belt 18, pulleys 20 and a suitable electric motor 22. Positioned at intervals around the circumference of rotor 12 are blade members 24 which may for example be conveniently formed by cutting a series of grooves in the general form of a V into a piece of steel 26 (Fig. 5) or the like having the same curvature as cylindrical rotor 12 so that it may be mounted thereon by bolts 28 as shown in Fig. 3. If desired the blade members may of course be cut right into the surface of rotor 12. The leading edge of each blade member 24 is undercut as shown at 29 to form a pair of cutting edges 30 and 32 on each side of the blade. In front of each row of blade members we provide a somewhat wedge-shaped channel 36 which is cut into the surface of rotor 12 immediately below the lower edge of blade member 24. The rear wall of channel 36 is preferably undercut in order to provide a jawed recess for gripping the polystyrene pellets, and as best shown in Fig. 5 the bottom of the channel gradually slopes upwardly away from the back wall in the direction of rotation substantially in a straight line to join the cylindrical surface of the rotor along a line that is positioned in front of the cutting edges of the blade members.

Rotor 12 is encased by a stator 38 mounted on shaft 14 by means of suitable bearings (not shown). Stator 38 carries tooth members 42 having a series of teeth 44 cut into one end of the member which are of the same size and configuration as the blade members 24. Tooth members 42 are mounted in stator 38 along a radial line emanating from the axis of rotor 12 by means of three pairs of bolts 46 and the tooth members are so positioned that the depressions between each tooth 44 corresponds with a blade member 24. As a result, the blades are free to mesh with the teeth and pass between them. In this connection it will be noted that the point at the top of each blade member projects out beyond the bottom of channel 36 and the surface at the leading end of the blade members and the back wall of channel 36 are undercut back under such point to the extent that these two surfaces slope back away from a radial line connecting the point at the top of the blade member with the axis of the rotor. As a result, when the sloping surfaces pass through the stator teeth which are positioned along a radial line emanating outwardly from the axis of rotor 12 they provide a camming surface that tends to force the cut material into the bottom of channel 36. The arrangement of bolts 46 is such that the clearance between teeth 44 and blade members 24 may be changed by turning the bolts. For this purpose bolts 46(a) which press against the surface of tooth members 42 are held in threaded engagement in hole 48 of stator 38 while bolts 46(b) are held in threaded engagement in hole 50 of tooth member 42. Bolts 46(b) are mounted in stator 38 by means of a hole 52 which is not threaded so that bolts 46(b) will not travel in the hole when turned. As a result of this arrangement of the bolts the distance between blade members 24 and stator teeth 44 may be changed by turning bolts 46(a) and (b) in different directions.

In operation hopper 54 is filled with polystyrene pellets 56 and as the rotor turns, pellets 56 feed down under the influence of gravity against the rotor and the pellets are picked up by the wedge-shaped chanels 36 and carried around to the right (Fig. 2) against teeth 44. As a row of blade members 24 pass through the teeth, pellets 56 are cut into small granules which are carried under the teeth by channel 36. As each row of blade members move between successive rows of stator teeth the granules tend to reorient themselves in front of the blade members and each time the blades pass through a row of teeth, that portion of the granule which projects above the top of channel 36 is cut off. Finally the granules drop from the machine through outlet 58. A guard 60 positioned to the left of inlet 62 holds pellets 56 in the hopper and insures unidirectional flow of pellets to prevent them from bypassing the stator teeth. If desired, a similar guard 64 may be positioned to the left of outlet 58.

The final size of the granules is determined by the depth of recess 36 and the clearance between teeth 44 and blade members 24. The fineness of the granules may be readily changed by changing the clearance between teeth 44 and blade members 24. If desired, the clearance between the blade members and each of the successive rows of teeth in the direction of blade rotation may be gradually reduced so that the work of cutting the granules is more evenly distributed among the four rows of teeth.

In the form of our invention illustrated herein the V-shaped blade members terminate in a very sharp point at the top of the V. This construction for the blade members is preferred particularly for granulating high-impact styrene (polystyrene compounded with a suitable elastomer to increase its resistance to fracture) because the sharp point readily punches a hole in the styrene pellets without smashing them and the hole is thereafter enlarged by the cutting edges on each side of the V until the pellet is broken open. As a result, the pellets are not crushed or ground and the proportion of fines produced is so low that the granulated material produced in our machine may be mixed directly with dry pigment without screening. The speed of the rotor may be varied but we prefer to operate the machine at about 550 to 600 R. P. M. At this speed little heat is generated and in rest runs the temperature of the granulated styrene was only ten degrees above the room temperature of the pellets in the hopper.

Although the granulating machine illustrated in the drawings has twelve rows of blade members 24 and four rows of stator teeth 44 the number of rows of blades and stator teeth may be changed from one row each up to any desired number depending upon the size of the equipment. Blade members 24 need not be integrated in a single piece of steel as illustrated but may be made in the form of individual blades and then attached to the rotor by suitable means. As previously described above the angularity of the sides of the V-shaped blades may be varied as desired.

It will be understood that it is intended to cover all changes and modifications of the preferred form of our invention herein chosen for the purpose of illustration which do not constitute departures from the spirit and scope of the invention.

What we claim is:

1. A machine for granulating polystyrene pellets which comprises the combination of a cylindrical rotor having blade members formed by means of a series of grooves in the general form of a V position around the face of the rotor, said grooves being interrupted at set intervals by a wedge-shaped channel member which is continuous across the face of the rotor and which undercuts the leading end portion of each blade member, means for driving the rotor, a stator having a plurality of rows of teeth adapted to mesh with the blade members for cutting the styrene pellets into granules, each of said teeth being positioned along a radial line extended outwardly from the axis of the rotor, each of said blade members being undercut to the extent that the surface of the leading end portion of each blade member is in a single plane which slopes back in a straight line away from a radial line connecting the outermost and leading portion of the blade member with the axis of the rotor, said undercut surface being extended radially inwardly of the bottom of the grooves of the blade members to a line where it meets the surface at the bottom of the wedge-shaped channel members to form a jawed recess which holds the polystyrene pellets in place so that the pellets will be cut when the blade members are rotated through the stator teeth and whereby the cutting action at any given time is restricted to a limited portion of the cutting edges of said blade members and stator teeth.

2. A structure as specified in claim 1 in which the machine includes a hopper mounted at the top thereof, said hopper having its discharge outlet in position to feed polystyrene pellets down under the influence of gravity against the rotor which by means of the blade members and wedge-shaped channel members carry the polystyrene pellets against the stator teeth.

3. A structure as specified in claim 1 which includes a guard member positioned adjacent one side of the discharge outlet of the hopper which guard member is adapted to cooperate with the rotor to insure a unidirectional flow of pellets through the machine.

References Cited in the file of this patent

UNITED STATES PATENTS

| | | |
|---|---|---|
| 577,278 | Autenrieth | Feb. 16, 1897 |
| 662,350 | Bursells | Nov. 20, 1900 |
| 817,382 | Merrill | Apr. 10, 1906 |
| 821,448 | Allbrecht | May 22, 1906 |
| 823,672 | Dobbs et al. | June 19, 1906 |
| 920,869 | Hiss | May 4, 1909 |
| 1,131,230 | Giddings | Mar. 9, 1915 |
| 1,973,169 | Ielfield | Sept. 11, 1934 |
| 2,639,096 | Henerfeld | May 19, 1953 |

FOREIGN PATENTS

| | | |
|---|---|---|
| 128,457 | Sweden | Mar. 30, 1950 |
| 212,521 | Germany | Apr. 15, 1908 |